United States Patent [19]

Becker

[11] 4,157,454

[45] Jun. 5, 1979

[54] METHOD AND SYSTEM FOR MACHINE ENCIPHERING AND DECIPHERING

[75] Inventor: Wolfram Becker, Niedernhausen, Fed. Rep. of Germany

[73] Assignee: International Business Machines Corporation, Armonk, N.Y.

[21] Appl. No.: 862,251

[22] Filed: Dec. 19, 1977

[30] Foreign Application Priority Data

Dec. 22, 1976 [DE] Fed. Rep. of Germany ....... 2658065

[51] Int. Cl.² .............................................. H04L 9/02
[52] U.S. Cl. ....................................... 178/22; 364/900
[58] Field of Search .......................................... 178/22

[56] References Cited

U.S. PATENT DOCUMENTS

| | | | |
|---|---|---|---|
| 3,958,081 | 5/1976 | Ehrsam et al. | 178/22 |
| 3,962,539 | 6/1976 | Ehrsam et al. | 178/22 |
| 4,074,066 | 2/1978 | Ehrsam et al. | 178/22 |
| 4,078,152 | 3/1978 | Tuckerman | 178/22 |

*Primary Examiner*—Howard A. Birmiel
*Attorney, Agent, or Firm*—Philip Young

[57] ABSTRACT

Variable length data words are processed segment-by-segment together with corresponding segments of an enciphering key. As a function of the contents of a data segment, one of several modification modes is chosen. In accordance with the chosen modification mode, the enciphering key is changed following each enciphering operation of a segment. The described steps are preferably carried out three times for the full data word. The result of the third cycle represents the enciphered data word. Deciphering is effected in the same manner.

25 Claims, 6 Drawing Figures

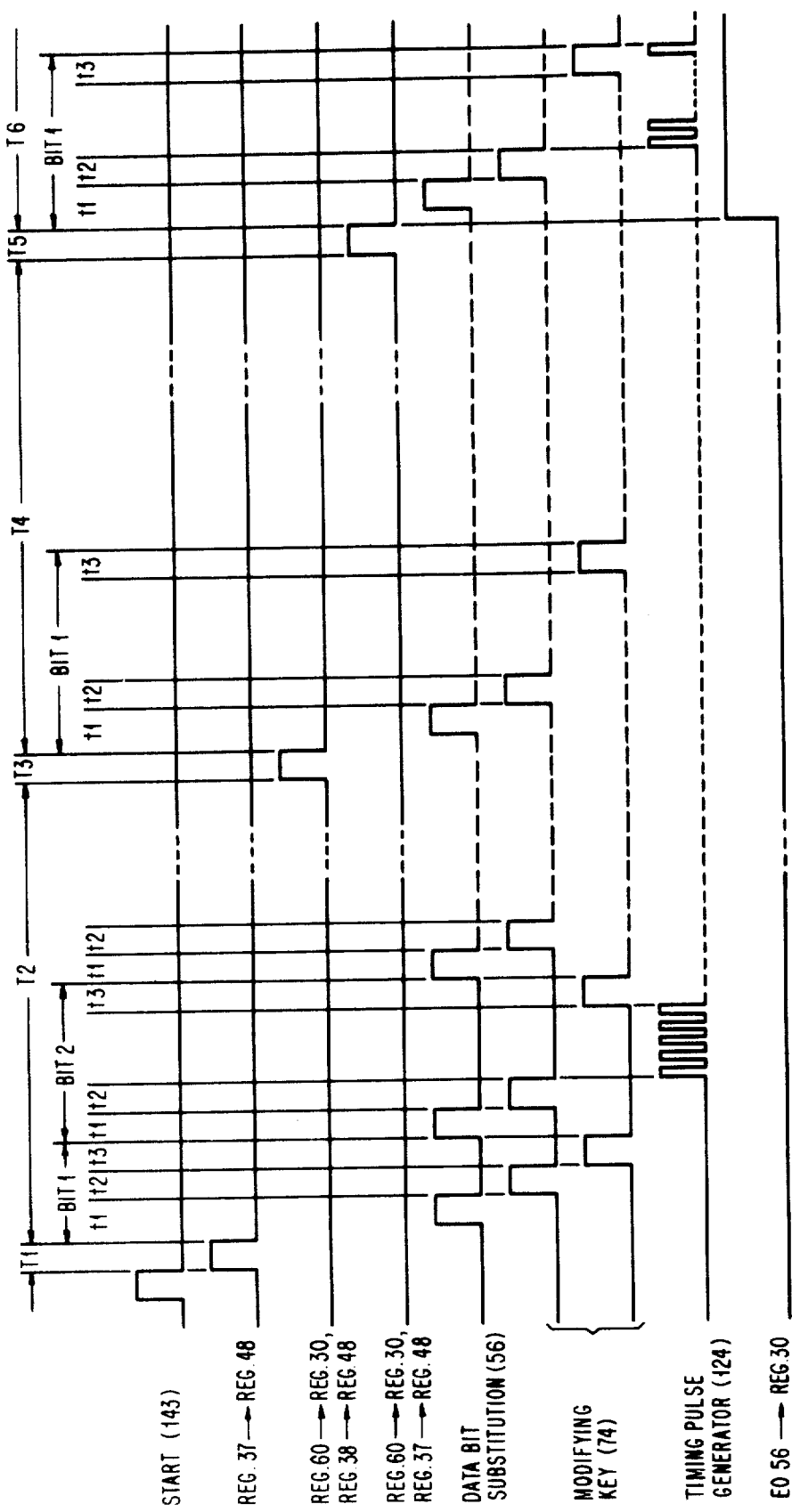

METHOD AND SYSTEM FOR MACHINE ENCIPHERING AND DECIPHERING

BACKGROUND OF THE INVENTION

The invention relates to a method for the machine enciphering and the authorized deciphering of multi-digit data as well as to a system for implementing the method.

Electronic data processing systems are used to a considerable extent as central data service systems accessible to a plurality of users via remote input/output terminals. It is important for such systems to provide data privary and protection against unauthorized use. For the purpose of data security, it is known to provide enciphering systems at those points of the system which are particularly liable to unauthorized access. This applies, for example, to transmitters of remote data processing lines or to data base storages shared by several users.

Basically, the sequential enciphering method and the block cipher method are distinguished between. With the sequential method, a key sequence is generated from an initial key, and the sequence thus obtained is used to encopher by substitution, i.e., replacing one data element by another of the sequence of data elements to be enciphered. This method is described by H. Feistel in an article "Cryptography and Computer Privacy," Scientific American, May 1973, Vol. 228, No. 5, pp. 15 to 23. In accordance with this method, the n-th data element is combined with the n-th key element in a suitable manner, for example, by modulo-2-addition. In the sequential method, the number of data elements is insignificant, as enciphering is effected in a continuous pass. For deciphering, the same method and the same key sequence are used. However, this method is secure only when a particular key sequence is used for one or a few enciphering steps, as it is possible to decode the key sequence from an enciphered information, so that any further information processed with that key sequence is no longer protected.

According to the block cipher method a data block of a predetermined length is enciphered by repeated and alternate permutation and substitution. Permutation is effected by mutually exchanging the elements of the data block in accordance with a predetermined pattern, while substitution is performed in parallel in the manner described above under control of an enciphering key for the elements of the data block. This method is also described in the above-noted article by H. Feistel.

In systems employing the block cipher method, it is also known for enciphering or deciphering to be carried out in successive iterations and to change the enciphering key after each iteration in accordance with a predetermined pattern. For this purpose, the bits of a data block to be enciphered are initially fed to a substitution stage whose result is permuted. The result thus obtained and the key word are subjected to a modulo-2-addition, the result of which is subsequently used for a further modulo-2-addition with the original data block. After the enciphering key has been changed by means of a predetermined positional shift, these operation steps are repeated with the result available at that stage. This process is continued until a full shift cycle of the enciphering key has been completed. The result available at that stage is the enciphered version of the original data block.

Also known are enciphering/deciphering arrangements wherein a data block to be enciphered is subdivided into segments which are sequentially processed. There are two series-connected sets of shift registers which are provided with an input/output coupling and the first one of which serves as an input register set for the data block to be enciphered, while the second one serves as a merge register set. The number of shift registers in each set corresponds to the bit number of a segment. The segments of the data block stored in the input register set together with selected segments of the enciphering key are successively subjected to one or several substitution operations. In the merge registers, the result bits of these operations are logically combined with the original data bits of the segment being processed or they are subjected to a repeated substitution operation. Although with arrangements of this kind enciphering or deciphering are to some extent serially effected, they nevertheless require extensive circuitry.

The methods described above are used mainly for the protection of data transmissions. However, it may be desirable to encipher stored data, in order to protect, for example, personnel data stored in a central data base against unauthorized access. The sequential methods described are inadequate here, since such applications do not permit a frequent change of key. The block enciphering methods, on the other hand, have the disadvantage that they are only suitable for fixed length data fields, whereby the block length has to be chosen fairly great for safety reasons. However, enciphered, different length data fields to be stored having a length that is increased to a block length or to a multiple of a block length by the addition of fill data elements require more storage space and longer transmission times. In the case of a data field to be protected by enciphering, an adaptation of the length to the block length necessitates a reorganization of the data base.

SUMMARY OF THE INVENTION

It is the object of the present invention to provide an enciphering/deciphering method which, while eliminating the above disadvantages, ensures a high degree of safety during the enciphering of variable length data fields, even when the latter are relatively short, and which requires comparatively few circuit means. Another object of the invention is to provide an advantageous system for executing such method.

These and other objects are achieved by the present invention wherein variable length data words are processed segment-by-segment together with corresponding segments of an enciphering key. As a function of the contents of a data segment, one of several modification modes is chosen. In accordance with the chosen modification mode, the enciphering key is changed following each enciphering operation of a segment. The described steps are preferably carried out three times for the full data word. The result of the third cycle represents the enciphered data word. Deciphering is effected in the same manner.

More particularly, a data segment and a key segment of a first key word (first enciphering key half) are on the one hand subjected to a substitution generating a modified version of the data segments, and on the other hand select one of several different modification operations, by means of which the first key word is modified before the next substitution operation. These steps are repeated with the remaining data segments of the data register and the corresponding segments of the repeatedly modified first key word. With the modified version of the data, a permutation operations is carried out, the result of which again causes a data segment and a key segment of a second key word (second enciphering key half) to be subjected on the one hand to a substitution operation which again generates a modified version of the data segment, and on the other hand selects one of several different modification operations, by means of which the second key word is modified before the next substitution operation. The last steps are repeated with the remaining segments of the modified data and corresponding segments of the repeatedly modified second key word.

BRIEF DESCRIPTION OF THE DRAWINGS

FIG. 6 shows a pulse diagram explaining the operation of the arrangement of FIG. 2.

DESCRIPTION OF THE PREFERRED EMBODIMENTS

The main steps of the method in accordance with the invention will be described by means of the embodiment shown in FIG. 1. The input data block 10 is a symbolic representation of a data source which may be, for example, a register or a data field in the work storage of a data processing system. Similarly, blocks 12, 14 and 15 are symbolic representations of the source of the enciphering key, and may also take the form of a register or a data field in the work storage of the processing unit of a computer. At the start of the enciphering operation, block 12 corresponds to key A representing one half of the enciphering key, while block 14 corresponds to key B representing the other half of the enciphering key. Block 15, similar to block 12, corresponds to key A, i.e., to the first half of the enciphering key. The variable length input data and key A and B, respectively, are processed segment-by-segment. In the case of the embodiment described below, each segment consists of a binary bit. However, this is no prerequisite for the method in accordance with the invention, whereby, for example, a segment may consist of one byte or of a random group of bits.

Figure 1:
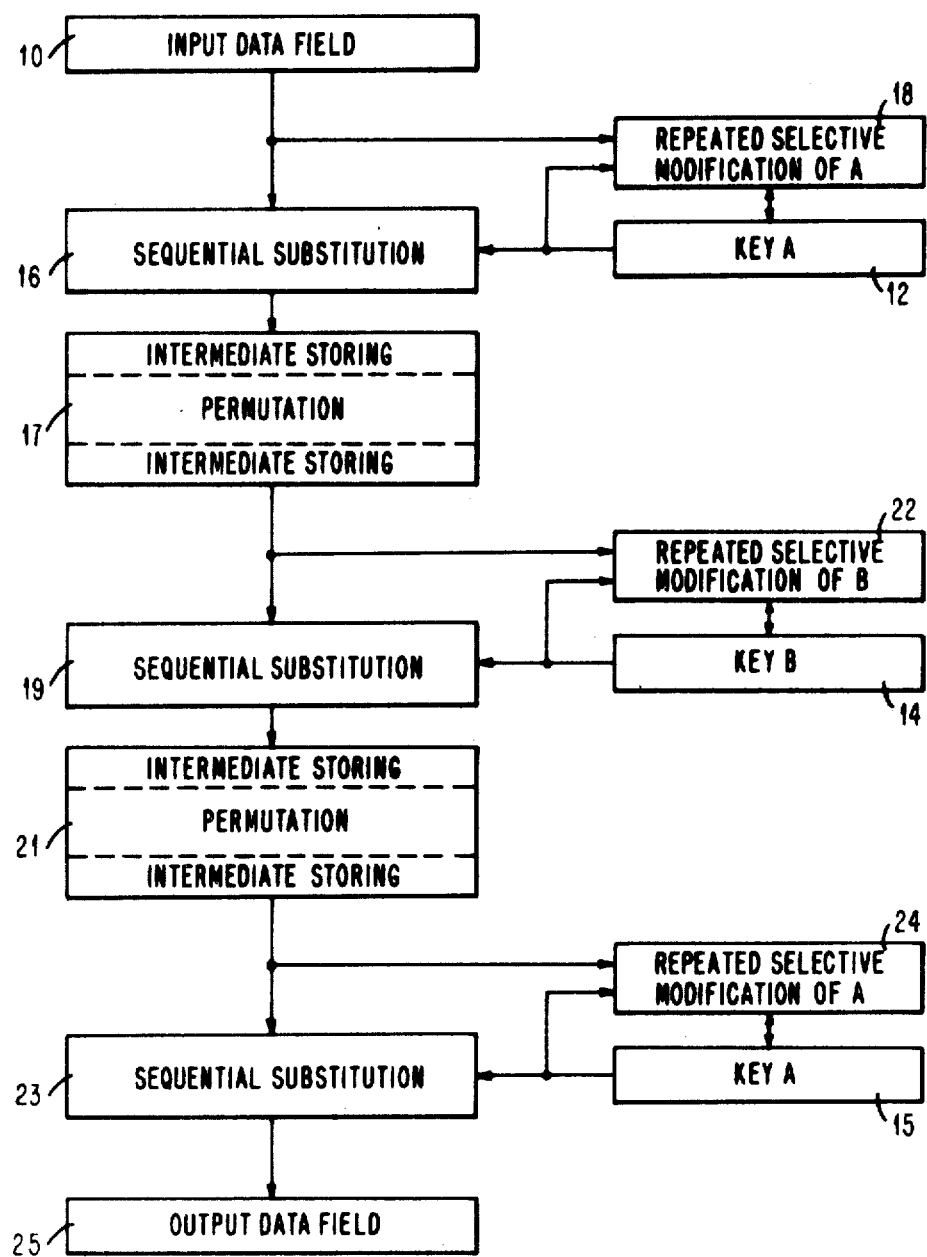
FIG. 1 shows a schematic flow diagram of an embodiment of the method in accordance with the invention.

An enciphering operation starts by subjecting a segment of the input data under control of a corresponding key segment to a substitution operation, as shown by block 16 in FIG. 1. This substitution operation may be an arithmetic or a logical combination, such as an exclusive-OR operation, whose result according to block 17 is initially buffered. Simultaneously, the data segment subjected to the substitution operation and the segment of key A controlling the substitution are used jointly to control a modification of key A. This step is shown in FIG. 1 by block 18. The modification modes provided differ, serving either to substitute the elements of key A or to permute said elements, or to combine both operations. The data segment and the corresponding key segment serve to select one of several predetermined modification modes. In the depicted embodiment, the selected modification mode extends to all bits of key A.

After key A has been modified, the above-mentioned partial steps are repeated with the next segment of the input data field. Under control of a corresponding segment of the modified key A, this segment is again subjected to the substitution operation of block 16, and the result is initially buffered. Simultaneously, the next modification of key A is initiated in block 18. After completion of this modification, the next segment of the input data field is processed, etc., until the whole input data field has been subjected to the serial substitution operation in accordance with block 16. At that stage the result of the substitution operation is buffered in block 17. This is followed by a symmetrical permutation of the buffered data field. The permutation may consist of a symmetrical bit offset, i.e., rotation, whereby the contents of the first, the second and the third bit position are respectively fed to the last, the second to last and the third to last, etc., bit position of the data field. The permutation of step 17 is followed by a further sequential substitution which is specified by block 19 and which corresponds to the substitution of block 16 with the exception that the individual substitution steps are not controlled by key A, but by key B. The result of each substitution of the data supplied by permutation step 17 is again buffered in accordance with step 21. Each substitution of a segment is followed by a selective modification of key B in block step 22 in the manner described for key A. These partial steps are repeated until all segments of the buffered result from permutation step 17 have been processed under control of key B modified after each partial step. Then step 21 performs a further permutation of the above-mentioned kind with the result of step 19. Under control of key A, the enciphering operation is completed with a renewed sequence of substitution operations according to step 23 with the result of step 21. After each substitution of one of the data buffered following the permutation of step 21, key A is selectively modified in block step 24 in the described manner. The result data of step 23 are fed to an output data field 25 which may be, for example, in a register or a data field of a work storage forming part of the processing unit of a computer.

The above description illustrates how the input data field is enciphered under control of an enciphering key which is frequently changed as a function of the data to be enciphered, so that the enciphered data are highly dependent upon the various bits of the input data field as well as upon the various bits of the two key word halves. Thus, effective enciphering produces the desired avalanche effect, by means of which the bit pattern in the input data field is rendered unrecognizable.

Deciphering is effected in accordance with the same scheme as shown in FIG. 1. If a symmetrical combination, such as exclusive-OR (modulo-2-addition), is chosen as a substitution operation of steps 16, 19 and 23, the original or source value is restored upon repetition of the same substitution, thus reversing the enciphering effect. The modification mode of key half A in steps 18 and 24 and key half B in step 22 is chosen in such a manner that a symmetrical sequence is obtained, i.e., the same modifications are used for diciphering and enciphering.

The Sequential Modification of Cipher Partial Fields A and B

As previously described, the data segments to be successively subjected to the substitution operations 16, 19 and 23 consist of one bit each. Thus, one key bit is required for performing the substitution of each segment, so that in each case two bits are available for selecting a particular modification mode for cipher key partial fields A and B. Accordingly, there are four different modification cases which are subsequently designated as C1, C2 and C3, and C4. With these modification cases, different modification modes can be associated. Each of these modification modes can consist of one or several modification steps, for example, one or several permutations and one or several substitutions. The modification steps are best chosen in such a manner that the same modification steps can be used for enciphering and deciphering and that merely the association of the modification steps with the modification cases has to be changed. This can be effected in pairs with the aid of a bistable switch, by means of which a first association of the modification steps and the modification cases is established during enciphering and by means of which this association is changed during deciphering. An example of this is shown in table I.

TABLE I

| Modification Case | Data Bit | Key Bit | Modification of Key Enciphering | Modification of Key Deciphering |
|---|---|---|---|---|
| C1 | 0 | 0 | Permutation Type 1<br>Substitution Type 1 | Permutation Type 1<br>Substitution Type 1 |
| C2 | 1 | 0 | Permutation Type 2<br>Substitution Type 1 | Permutation Type 2<br>Substitution Type 1 |
| C3 | 0 | 1 | Permutation Type 3<br>Substitution Type 1 | Permutation Type 1 |
| C4 | 1 | 1 | Permutation Type 1 | Permutation Type 3<br>Substitution Type 1 |

Table I shows that for the modification of the key in the present example there are four different modification steps which are associated individually or in combination with the modification cases C1 to C4. The steps consist of the permutation types 1 to 3 of one substitution type. The permutation types are carried out by positional offsets or shifts in the field of the key bit. The substitution type consists of an arithmetic operation, such as an addition, on two partial fields of the key. Modification case C1 is chosen when both the data bit and the key bit are 0. In this case, a type 1 permutation is carried out with one field of the key bits in the enciphering mode, and subsequently a type 1 substitution is performed with two partial fields of the key. These modification steps remain unchanged during deciphering. Modification case C2 is chosen when the data bit has the value 1 and the key bit the value 0. In this instance, a type 2 permutation and subsequently a type 1 substitution are carried out both during enciphering and deciphering. Modification case C3 is chosen when the data bit is 0 and the key bit is 1. In this case, a type 3 permutation is initially carried out during enciphering, which is followed by a type 1 substitution. During deciphering, merely a type 1 permutation is effected. Modification case 4 is chosen when both the data bit and the key bit are 1. In this case, modification is limited to a type 1 permutation when the key is enciphered. During deciphering a type 3 permutation and a type 1 permutation take place instead. Thus, the type 3 modification during enciphering corresponds to the type 4 modification during deciphering and vice versa.

Table I concerns the circuit example described herein in which the data segments to be sequentially processed consist of one bit each and processing is effected under control of one key bit each. However, it should be understood that the invention is not limited to this specific case. If the data segments to be sequentially processed consist, for example, of two bits which are processed under control of 2-bit segments of the key, there are 16 choices of modification modes. This permits increasing the number of different modification steps and the number of their combinations. Thus, it is possible to associate the different modification cases with those modification modes which correspond to the respective enciphering requirements. It is also possible to change the association between the modification steps and the modification cases from time to time, in order to increase the enciphering reliability.

The effectiveness of the modifications of the enciphering key requires that each modification generates a completely changed sequence of key bits. As the modifications are carried out as a function of the bits of the data to be enciphered, there is ensured that each bit of an enciphered data field is a function of each bit of original unenciphered data field and of each bit of the enciphering key.

The System of FIGS. 2 Through 5

Figure 2:
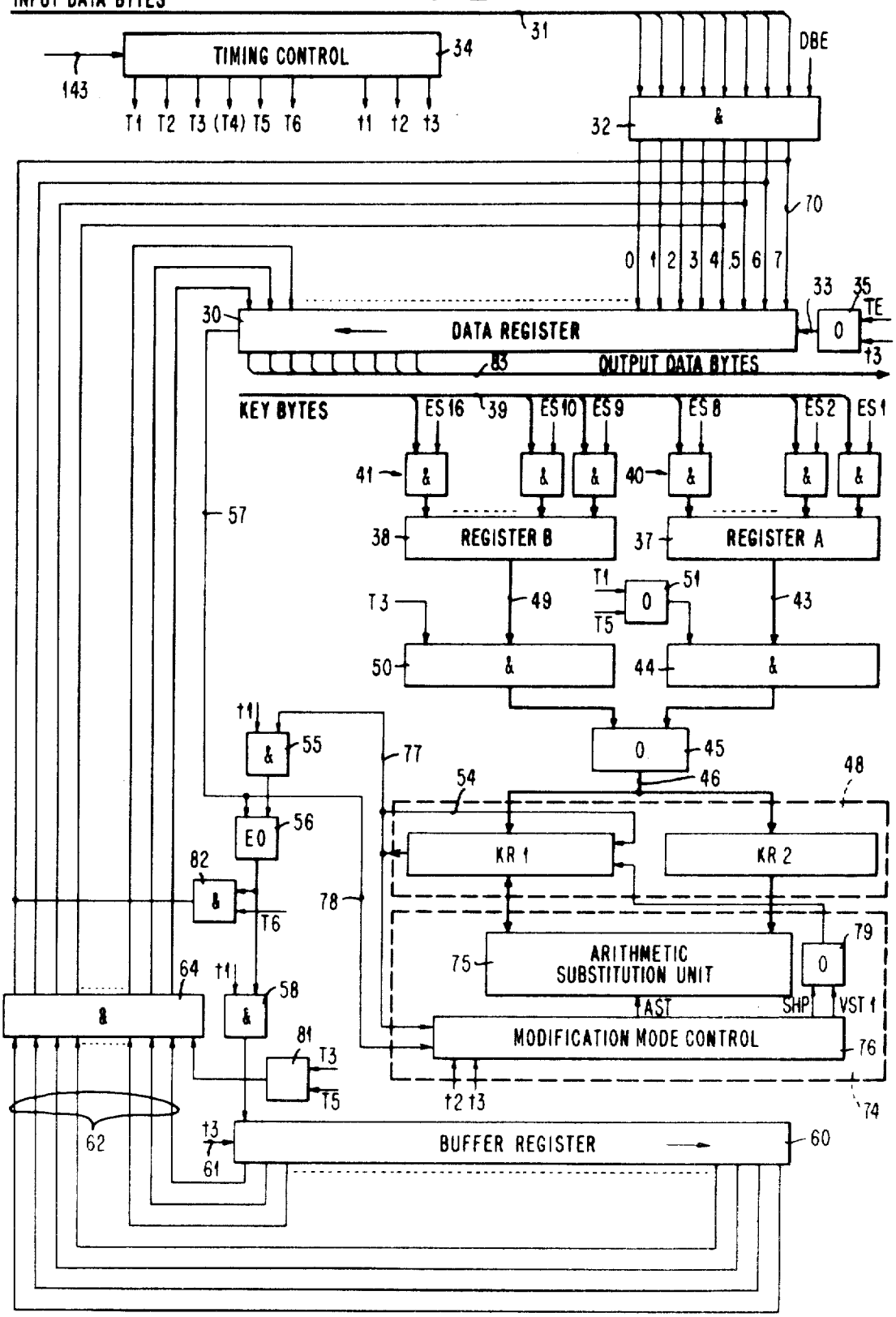
FIG. 2 shows a block diagram of an embodiment of an arrangement for implementing the method in accordance with FIG. 1.

The enciphering/deciphering arrangement shown in FIG. 2 comprises a data register 30 serving to accommodate a data field to be enciphered. Data register 30 has 128 bit positions and thus is suitable for storing a data field of a maximum length of 16 bytes. The input data are introduced byte-by-byte via a bus 31. The eight cores of bus 31 are connected via an AND gate 32 to the inputs of eight adjacent bit positions on the right-hand side of data register 30. Data register 30 is designed as a shift register to which shift clock pulses are applied via a line 33. Each of these pulses causes a shift by one position to the left. After each storage operation of an input data byte in register 30, the latter receives a series of eight clock pulses from a control circuit 34 via a line TE, an OR circuit 35 and line 33 in a manner to be described. These clock pulses cause the stored bytes to be shifted by one byte field to the left. Then the next byte is introduced, etc., until the whole data field is stored left-justified in data register 30. The origin of the input data bytes depends upon the respective application of the enciphering/deciphering arrangement of FIG. 2. The bytes may originate, for example, from the input unit of a key controlled terminal or from the output of the arithmetic unit of a processing system generating result data which are added to the contents of a data stored in an enciphered form.

The arrangement of FIG. 2 also comprises two registers 37, 38 which are subsequently also referred to as register A and register B and which serve to accommodate the enciphering key. The enciphering key has 16 bytes, one half of which is stored in register 37 and 38, respectively. Thus, registers 37, 38 have 64 bit positions each. The bytes of the enciphering key are fed to registers 37 and 38 via a bus 39 and AND circuits 40, 41. Each of the AND circuits 40, 41 is associated with a key byte and thus consists of eight AND gates whose output lines are connected to the input lines of eight bit positions in registers 37 and 38. Input bus 39 has eight cores which are connected in parallel to the inputs of the eight AND gates of each AND circuit 40, 41. Each of the AND circuits 40, 41 has a control input ES1 to ES16, via which the AND gates of the corresponding AND circuit are opened in parallel. The key bytes are sequentially fed to registers 37, 38 via bus 39, for which purpose AND circuits 40, 41 are consecutively opened by applying one control signal each to lines ES1 to ES16.

One output bus 43 of register 37 is connected to a key register 48 via an AND circuit 44, an OR circuit 45 and a bus 46. Similarly, register 38 comprises an output bus 49 which is linked to key register 48 via an AND circuit 50, the OR circuit 45 and bus 46. AND circuit 44 is opened by clock signals T1 and T5 which are generated in a manner still to be described and which are applied via an OR circuit 51. AND circuit 50 is opened by clock signals on a line T3.

Registers 37 and 38 act as buffer registers, keeping the two halves of the enciphering key available for processing. For the purpose of processing, the contents of one of the registers 37 and 38 are fed to key register 48 which has the same number of positions as one of the registers 37, 38. Key register 48 consists of two single registers KR1 and KR2, each of which has 32 bit positions and thus serves to accommodate four bytes. Register KR1 is designed as a shift register with an output/input feedback 54, thus permitting re-entry and rotational shifts, respectively, over the full bit position range. The series output of shift register KR1 is connected to the input of an AND circuit 55. An exclusive-OR circuit 56 has one input connected to the output of AND circuit 55 and its second input connected to the series output 57 of data register 30.

Exclusive-OR circuit 56 effects the sequential substitutions of steps 16, 19 and 23 of FIG. 1. Its output is linked, via an AND circuit 58, to the series input of a buffer register 60 designed as a shift register. AND circuits 55 and 58 receive clock signals t1 from control circuit 34 via a second input. In accordance with this control scheme, the data bit on the output 57 of data register 30 is exclusive-ORed with the key bit on the output of AND circuit 55 at clock time t1. The result of this logical combination is stored in the left-most bit position of buffer register 60. This register 60 receives shift clock pulses t3 via line 61. Under the influence of these pulses, the data bits are shifted by one position to the right. As the direction of shift in register 60 is opposite to that in register 30, the operation of the two registers produces a symmetrical bit position offset in the sense of a rotation, as previously described. This bit position offset corresponds to steps 17 and 21 in FIG. 1. Buffer register 60 has a parallel output in the form of a bus 62 which, via an AND circuit 64, is connected to the parallel input of data register 30.

A modification circuit 74, carrying out the operation of steps 18, 22 and 24 of FIG. 1, is associated with key register 48. Modification circuit 74 comprises an arithmetic substitution circuit 75 connected to registers KR1 and KR2, as well as a modification mode control circuit 76 which receives input signals from the series output of shift register KR1 via a line 77 and from a series output 57 of shift register 30 (data register) via a line 78. The modification mode control circuit 76 generates control signals on lines AST, SHP and VST1 as a function of the input signals applied via lines 77, 78. Line AST serves as c control line for the arithmetic substitution circuit 75, whereas different sequences of positional shift pulses are fed to register KR1 or on lines SHP and VST1 an OR circuit 79.

Figure 3:
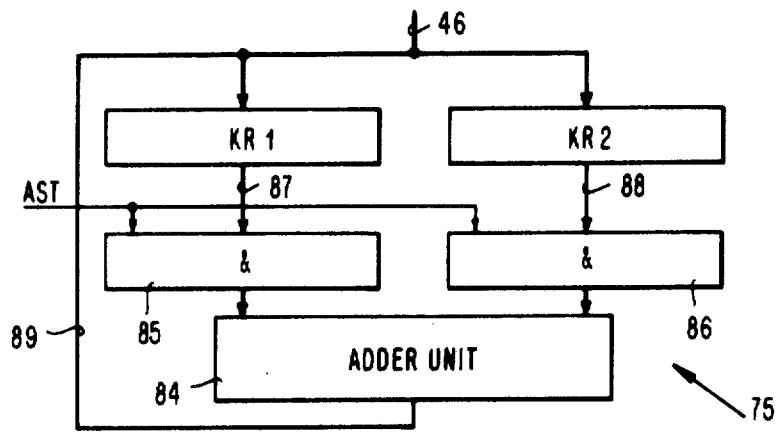
FIG. 3 shows an arithmetic cipher key substitution circuit suitable for use in the arrangement of FIG. 2.

In the illustrated embodiment, the arithmetic substitution circuit 75 is shown in FIG. 3 and consists of a conventional adder 84 having input lines connecting with one AND circuit 85, 86 each. The number of positions of adder 84 corresponds to that of register KR1 or KR2. In accordance with this, each of the AND circuits 85 and 86 has a number of AND gates corresponding to the number of positions of each of these registers. The AND gates 85, 86 are opened in parallel fashion by control signals on line AST. The AND gates of AND circuit 85 are connected to the output lines of the bit positions in register KR1 via a bus 87, while the AND gates of AND circuit 86 are linked to the output lines of the bit positions in register KR2 via a bus 88. The outputs of the adder 84 are connected to the inputs of the bit positions in register KR1 via a bus 89. On the output of adder 84 buffer or delay circuits, not shown, are arranged which ensure a stable switching state between the input 87 and the output 89 of the adder. As register KR1 contains one half (4 bytes) and register KR2 the other half (4 bytes) of the key field stored in key register 48, adder 84 adds these two key word fields after receipt of a control signal on line AST, the result being stored in register KR1 via bus 89. Thus, the original contents of register KR1 are subjected to a substitution operation, by means of which the contents of register KR1 are replaced by the sum formed by adder 84.

Figure 4:
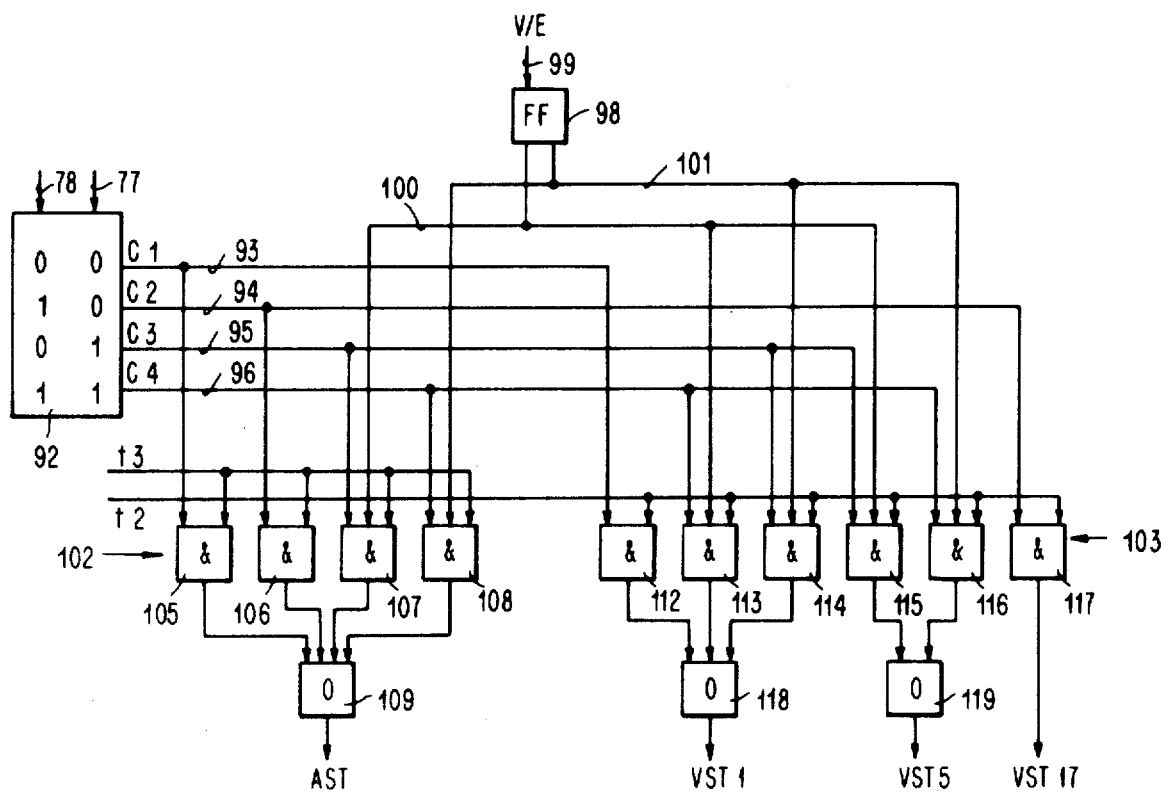
FIG. 4 shows a part of a modification mode control circuit for use in the arrangement of FIG. 2.

FIG. 4 shows a partial view of the modification mode control circuit 76 shown in FIG. 2. This circuit comprises a decoder 92, to whose input the two lines 77, 78 of FIG. 1 are connected. As a function of the combination of the input signals appearing on these lines, decoder 92 supplies output signals C1, C2, C3, C4 on lines 93 to 96, respectively. The modification mode control circuit 76 also comprises a flip-flop circuit 98 which serves as a mode control circuit. When an enciphering operation is to be executed, flip-flop circuit 98 remains in the inoperative state (0-state). If, on the other hand, a deciphering operation is to be executed, a deciphering control signal V/E is applied to line 99 at the beginning of this operation, switching flip-flop circuit 98 to the one-state. The complementary output lines 100 and 101 to flip-flop circuit 98 together with lines 93 to 96 are connected, as shown, to AND circuits 102 and 103. AND circuit 102 has four AND gates 105 to 108, each of which receiving clock signals t3 via an input. Each of the AND gates 105 to 108 is connected to one of the lines 93 to 96, respectively, via a second input. In addition, AND gate 107 is connected with a further input to output line 100 of flip-flop circuit 98, while AND gate 108 is connected with a further input to the output line 101 of this flip-flop circuit. The outputs of AND gates 105 and 108 are linked to line AST via an OR gate 109. AND cicuit 102 thus supplies an output signal on line AST at clock time t3 the decoder generates selection signals C1 and C2 on lines 93 and 94. It also supplies an output signal on line AST if a selection signal C3 is present, when flip-flop circuit 98 is in the 0-state, thus indicating an enciphering operation. Such an output signal is also supplied if a selection signal C4 is present, when flip-flop circuit 98 is in the 1-state, thus indicating a deciphering operation.

AND circuit 103 consists of six AND gates 112 to 117, each receiving clock signals t2 via a first input. AND gate 112 receives a second input on output line 93 of decoder 92, and AND gate 117 receives a second input on line 94. In the same manner, AND gates 114 and 115 are each connected to receive a second input on line 95, while AND gates 113 and 116 are connected to receive a second input on line 96. AND gates 113 and 115 also receive a signal from output line 100 of flip-flop circuit 98 as a third output. Similarly, AND gates 114 and 116 receive a signal from output line 101 of flip-flop circuit 98 as a third input. The outputs of AND gates 112 to 114 are connected to the input of an OR gate 118 which provides an output on line VST1. The outputs of AND gates 115 and 116 are connected to the input of an OR gate which provides an output on line VST5, while the output of AND gate 117 is provided on a line VST17. Thus, AND circuit 103 supplies an output signal on line VST1 at clock time t2 when the decoder produces a selection signal C4 and flip-flop circuit 98 indicates an enciphering operation by means of a signal on output 100, and finally also when the decoder generates a selection signal C3 on line 95 and flip-flop circuit 98 indicates at that time a deciphering operation via its output line 101. At time t2, AND circuit 103 supplies a signal on line VST5 when the decoder generates a selection signal C3 and flip-flop circuit 98 indicates an enciphering operation, and when the decoder generates a selection signal C4 and flip-flop circuit 98 indicates a deciphering operation. Finally, at clock time t2, a signal is generated on line VST17 irrespective of the state of flip-flop circuit 98, when decoder 92 supplies a selection signal C2.

As mentioned previously in connection with FIG. 3, line AST leads to AND circuits 85 and 86 on the input of adder 84. The AST line signal supplied by OR circuit 109 in FIG. 4 opens these AND circuits, enabling adder 84 to perform an addition. As shown in FIG. 2, line VST is connected via OR circuit 79 to the shift clock input of register KR1, causing in the latter a shift by one position to the left.

Figure 5:
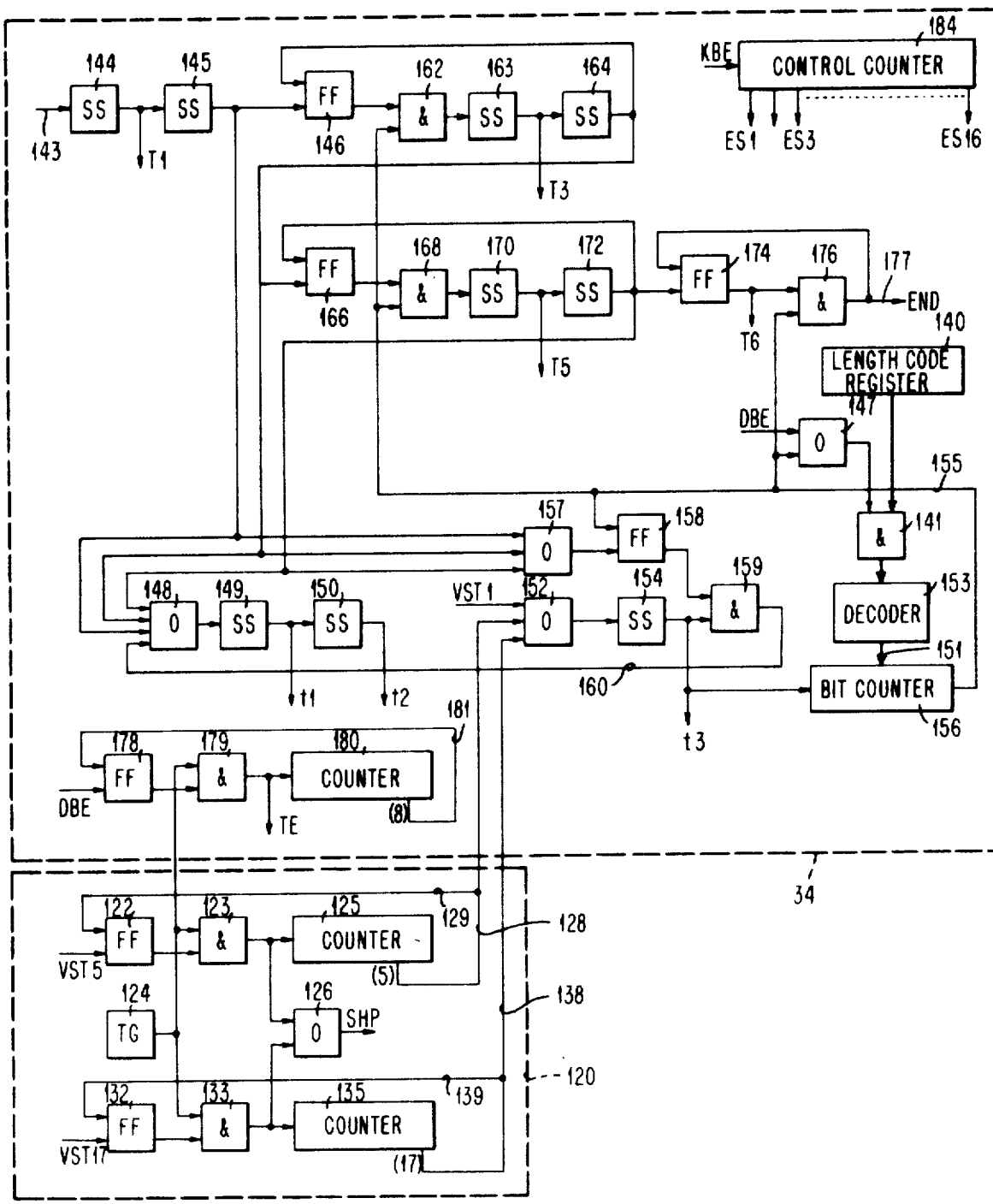
FIG. 5 shows a block diagram of a control circuit suitable for use in the arrangement of FIG. 2, as well as a further part of the modification mode control circuit of FIGS. 2 and 4.

Lines VST5 and VST17 lead to a further part 120, shown in detail in FIG. 5, of the modification mode control circuit 76. As shown in FIG. 5, line VST5 is linked to the input of a flip-flop circuit 122, the output of which is connected to an AND circuit 123. A second input of AND circuit 123 receives pulses from a clock signal generator 124, indicated by TG. When a signal on line VST5 has set flip-flop circuit 122 to the 1-state, said circuit opens AND circuit 123 via its output, so that AND circuit 123 subsequently passes clock signals from clock generator 124 to counter 125. These pulses are also fed via an OR circuit 126 to line SHP on which they are fed to OR circuit 79 (FIG. 2), whence they are applied to the shift clock input of register KR1. Counter 125 has a counting capacity of at least five, and may be designed, for example, as a three-stage binary counter.

Counter 125 supplies a signal on an output 128 when it has reached counting position 5 as indicated. This signal is fed via a line 129 to the reset input of flip-flop circuit 122, setting the latter to the zero-state in which it blocks AND circuit 123, so that no further pulses from generator 124 can reach line SHP. Thus, circuit 122 to 129 supplies in each case a series of five shift lock pulses to register KR1.

The signals on line VST17 from the AND circuit 117 in FIG. 4 control a similar circuit which comprises a flip-flop circuit 132, an AND circuit 133 and a counter 135. Counter 135, shown in FIG. 5, is also fed by clock generator 124 via AND circuit 133. Flip-flop circuit 132 opens AND circuit 133 which applies clock pulses both to counter 135 and, via OR circuit 126, to line SHP. Counter 135 has a counting capacity of at least 17, as indicated, and may be designed as a five-stage binary counter. When counter 135 has reached counting position 17, it generates a signal on an output line 138, which is fed back to the reset input of flip-flop 132, setting the latter to the zero-state, so that AND circuit 133 is blocked and no further clock pulses can be applied to line SHP. Thus, upon the occurrence of a signal on line VST17, circuit 132, 133, 135, 138, and 139 generates a series of 17 shift clock pulses on line SHP which, via OR circuit 79, are fed to the shift clock input of register KR1 as shown in FIG. 2. This shifts the contents of register KR1 by 17 positions to the left, the key bits excited on the left end of register KR1 being fed back to the series input of register KR1 (rotational shift) via feedback line 54.

The function of circuit parts 48 and 74 shown in FIG. 2 will be described in summary by means of the following table II. This table is similar to table I, showing for the embodiment of FIGS. 2, 3 and 4 the association between the individual modification operations and the four possible modification cases.

TABLE II

| Selection Control Signal | Data Bit of Line 78 | Key Bit of Line 77 | Modification Mode | |
|---|---|---|---|---|
| | | | Enciphering | Deciphering |
| C1 | 0 | 0 | Rotational Shift in KR1 by 1 Position; (KR1)=(KR1)+(KR2) | Rotational Shift in KR1 by 1 Position; (KR1)=(KR1)+(KR2) |
| C2 | 1 | 0 | Rotational Shift in KR1 by 17 Positions; (KR1)=(KR1)+(KR2) | Rotational Shift in KR1 by 17 Positions; (KR1)=(KR1)+(KR2) |
| C3 | 0 | 1 | Rotational Shift in KR1 by 5 Positions; (KR1)=(KR1)+(KR2) | Rotational Shift in KR1 by 1 Position |
| C4 | 1 | 1 | Rotatinal Shift in KR1 by 1 Position | Rotational Shift in KR1 by 5 Positions; (KR1)=(KR1)+(KR2) |

Table II shows that to repeatedly modify the key bits in accordance with steps 18, 22 and 24 of FIG. 1, three different rotational shifts and one bit field addition are used in the illustrated arrangement. The rotational shifts are performed by single or repeated positional shifts of the bit field of the enciphering key stored in register KR1. Partial field addition is realized by adding the key bit field in register KR2 to the key bit field in register KR1, storing the result in register KR1. In the former case permutations are concerned, whereas in the latter a substitution is concerned. Both modification steps are consecutively performed; the positional shifts at clock time t2 and the partial field addition at clock time t3. This is effected in each case between two substitution operations of the data field bits, which are performed at clock time t1.

FIG. 5 shows a block diagram of timing control circuit 34, by means of which the generation of clock signals t1, t2, t3 and various other clock signals is explained. A start signal on line 143 actuates a monostable flip-flop circuit 144 which, upon its return to the inoperative state, produces an output signal appearing as a control signal on line T1. Simultaneously, a further monostable flip-flop circuit 145 is actuated which, upon its return to the inoperative state, sets a flip-flop circuit 146 to the one-state by means of an output signal and actuates a further monostable flip-flop circuit 149 via an OR circuit 148. The signal appearing on the output of monostable flip-flop circuit 149 is fed as clock signal t1 to the control line with the same reference symbol, actuating, in addition, a monostable flip-flop circuit 150 whose output supplies the clock signal t2.

As explained by means of FIG. 4, clock signal t2 is used to generate the control signals VST1, VST5 and VST17. In the circuit part 120 of the modification mode control circuit 76, said control signals VST5 and VST17 cause the generation of shift pulse sequences under control of counters 125 and 135. Output lines 128 and 138 of these counters lead, among others, to two inputs of an OR circuit 152 to which also the control signal VST1 of FIG. 4 is applied via a further input. OR circuit 152 supplies an actuating signal to a monostable flip-flop circuit 154, whose output is connected to both the control signal line t3 and to the input of a presettable bit counter 156. The maximum counting capacity of bit counter 156 corresponds to the number of bit positions of data register 30. If register 30, as assumed above, has 128 bit positions, the bit counter 156 must have a maximum counting capacity of 128 so that it may be designed as a seven-stage binary counter. Bit counter 156 serves to indicate when the last bit from data register 30 has been processed by substitution circuit 56.

The arrangement of FIG. 2 is capable of processing data fields of variable length. The length of these data fields is indicated in a manner known per se by a length code which specifies, for example, the byte number contained in a data field. This must be taken into account by the operation of bit counter 156. For this purpose, bit counter 156 is designed as a presettable counter counting from the respective preset value towards zero and which upon reaching zero emits a signal on output line 155. Counter 156 has a presetting input 151 connected to the output of a decoder 153. The length code belonging to the respective data field to be processed is fed to decoder 153 from a length code register 140 via an AND circuit 141. The value concerned is a binary value specifying the number of bytes constituting the respective data field. In decoder 153, this length code is converted into a binary value denoting the number of bits contained in that data field. Thus, decoder 153 converts a number of bytes into a corresponding number of bits. The binary output value of decoder 153 is fed to bit counter 156 via line 151 such that said counter is preset to the binary value appearing on the output of decoder 153. Starting from this preset value, the counting pulses applied by monostable flip-flop circuit 154 cause counter 156 to be decremented in steps down to zero.

The above-mentioned monostable flip-flop circuit 145 supplies, among others, a signal to a flip-flop circuit 158 via an OR circuit 157, setting circuit 158 to the one-state. As the reset input of flip-flop circuit 158 is connected to output 155 of bit counter 158, on which the latter emits a signal after a zero count has been reached, flip-flop circuit 158 remains in the one-state as long as there are data bits to be processed in data register 30. In this state, flip-flop circuit 158 supplies an output signal to an AND circuit 159, opening the latter for the passage of output signals from monostable flip-flop circuit 154, said signals being fed to a second input of AND circuit 159. The output of AND circuit 159 is connected, via a feedback line 160, to an input of OR circuit 148 providing output signals that actuate the monostable flip-flop circuit 149. As long as AND circuit 159 is open, the generation of clock signals t1, t2 and t3 is cyclically repeated. The number of the repeat cycles corresponds to the number of positions of the data field to be processed and stored in register 30.

The output signals of bit counter 156 are fed, among others, to a first input of an AND circuit 162 which by means of a second input is connected to the one-output of flip-flop circuit 146. The output signal of AND circuit 162 actuates a monostable flip-flop circuit 163, the output of which is linked to the control line T3 and to a further monostable flip-flop circuit 164. After having been actuated, the latter flip-flop circuit generates a signal upon returning to its inoperative state. This signal serves to reset flip-flop circuit 146 to its inoperative state, thus blocking AND circuit 162, so that no further output pulses of counter 156 can be fed to monostable flip-flop circuit 163. The output signal of monostable flip-flop circuit 164 also serves to set a further flip-flop circuit 166 to the one-state in which the latter conditions an AND circuit 168 for the passage of an output pulse of bit counter 156. A further function of the output signal of monostable flip-flop circuit 164 is to actuate monostable flip-flop circuit 149 via OR circuit 148, thus restarting the cyclical generation of clock pulses t1, t2, t3. The cyclical repetition of this clock signal sequence is ensured by the output signal of monostable flip-flop circuit 164 also being applied to OR circuit 157, the output signal of which switches flip-flop circuit 158 to the one-state. This holds the AND circuit 159 open for the feedback of output signals of monostable flip-flop circuit 154 to monostable flip-flop circuit 149 via line 160 and OR circuit 148. This is preceded by the output signal of bit counter 156 opening AND circuit 141 via an OR circuit 147, in order to feed bit counter 156 with the bit equivalent of the length code.

At the next time when the bit counter 156 reaches a zero count, it again supplies an output signal on line 155, which in this case does not affect AND circuit 162, since the latter is closed in the absence of an output signal from flip-flop 146. However, the output signal of counter 156 passes AND circuit 168 opened by flip-flop circuit 166, thus actuating a monostable flip-flop circuit 170 which generates a clock signal T5 on the control line with the same reference symbol, and, in addition, actuates a further monostable flip-flop circuit 172. The output signal of monostable flip-flop circuit 172 restores flip-flop circuit 166 to the zero-state, starts a new cycle of monostable flip-flop circuits 149, 150, 154 via OR circuit 148, and restores flip-flop circuit 158, which was previously reset by the last output signal of bit counter 156 to the one-state via OR circuit 157. The output signal of monostable flip-flop circuit 172 also serves to set a flip-flop circuit 174 to the one-state. In this state, said flip-flop circuit 174 supplies a conditioning signal to an AND circuit 176. AND circuit 176 receives a second input which is linked to the output line 155 of bit counter 156. The output line of flip-flop circuit 174 is also connected to a control line T6. The output of AND circuit 176 supplies a signal on line 177 indicating the end of an enciphering/deciphering operation and also serves to reset flip-flop circuit 174.

Clock control circuit 34 of FIG. 5 also comprises a circuit for generating clock signals TE for entering the input data bytes into the data register 30 as shown in FIG. 2. This circuit consists of a flip-flop circuit 178, an AND circuit 179 and a counter 180 having a counting capacity of 8. Flip-flop circuit 178 receives a data byte input control signal DBE which is supplied by that unit of a data processing system which requests data enciphering or deciphering and which serves to indicate that data register 30 is to be fed with data to be enciphered or deciphered. Signal DBE sets flip-flop circuit 178 to the one-state in which it conditions AND circuit 179 for passing clock pulses from the output of clock 124. Clock pulses TE appearing on the output of AND circuit 179 are fed via the line indicated by the same reference to OR circuit 35 and line 33, shown in FIG. 2, to the shift clock input of data register 30. Simultaneously, the clock signals are fed from the output of AND circuit 179 to counter 180, incrementing the latter until it has reached its eighth counting position and generates an output signal on line 181. This signal resets flip-flop circuit 178 to the zero-state, so that AND circuit 179 is closed. Thus, on line TE there occurs a series of eight pulses serving to shift the contents of register 30 by eight positions to the left.

For the input of the key bytes into registers 37 and 38 via bus 39, a control counter 184 performs a control function similar to that of circuit 178 to 181 for the data input bytes. Control counter 184 is actuated by the key byte input control signals KBE from the data processing system and has sixteen counting positions, each of which supplies control signals to one of the lines ES1 to ES16. Each of the lines ES1 to ES16 is connected to one of the AND circuits 40 and 41, respectively, in the manner shown in FIG. 2. A signal occurring on this line opens the corresponding AND circuit, thus permitting the key byte encountered on bus 39 at that time to be transferred to register 37 or 38.

The Operation of the Enciphering/Deciphering Arrangement of FIG. 2

The operation of the arrangement of FIG. 2 will be described below by means of the pulse time diagram of FIG. 6 and with reference to FIG. 1.

At the start of an enciphering/deciphering operation, a data field of up to sixteen bytes from the data flow to be enciphered or deciphered is fed to data register 30. To accomplish this, the input data bytes are successively applied to bus 31 and, simultaneously, a data byte input control signal DBE is generated which serves to enter a data byte into the eight adjacent bit positions on the right-hand side of data register 30 via AND circuit 32. Signal DBE also triggers the generation of a cycle of eight clock signals TE in the manner described in connection with FIG. 5. These clock signals cause the contents of register 30 to be shifted by eight positions to the left, so that the eight bit positions on the right-hand side of register 30 are cleared for the receipt of the next byte. This process is repeated sixteen times, so that the input data are stored left-justified in register 30. Before the data field is entered into register 30, the data field length code is entered into length code register 140. The input control signal DBE is fed, via OR circuit 147, to AND circuit 141, opening the latter for setting bit counter 156 in accordance with the number of bits the length code consists of.

Simultaneously or overlapped in time with the entry of the data bytes, the key bytes are fed to registers 37 and 38 via bus 39. This is effected in the described manner via AND circuit 40 and 41 under control of counter 184. Between every two key bytes, the unit of the data processing system requesting the enciphering/deciphering operation generates a key byte input control signal KBE which increments control counter 184. This process is repeated until all sixteen bytes of the enciphering key have been entered into the two registers 37 and 38. A mode control signal V/E is applied via line 99 (FIG. 4) to flip-flop circuit 98. In the case of a requested enciphering operation, signal V/E is a binary zero, so that flip-flop circuit 98 remains in the inoperative state, whereas in the case of a requested deciphering operation, signal V/E is a binary one causing said flip-flop circuit to be set to the one-state. In the description that follows, it is assumed that an enciphering operation has been requested and that signal V/E retains flip-flop circuit 98 in its inoperative state.

A start signal on line 143 initiates the enciphering operation by triggering a clock signal on line T1 via monostable flip-flop circuit 144. This clock signal is fed via OR circuit 51 to AND circuit 44 which is thus opened to transfer the contents of register A to key register 48. During this period, equal parts of the contents of register A are stored in registers KR1 and KR2. In the further course of the operation of control circuit 34, sequence control circuit 149, 150, 154 is actuated, initially generating a clock signal t1. By opening AND circuits 55 and 58 (FIG. 2), this clock signal causes the data bit in the left-most bit position of register 30 to be combined in exclusive-OR circuit 56 with the key bit in the left-most bit position of register KR1, the result of this combination being stored in the left-most bit position of buffer register 60.

Clock signal t2 subsequently generated by control circuit 34 is fed to AND circuits 103, in order to generate a control signal VST1, VST5 or VST17 as a function of the data bit on line 78 and the key bit on line 77. For the purpose of this description, it is assumed that the data bit has the value "1" and the key bit the value "0". In this case the decoder, in accordance with table II, supplies a selection control signal T2 on line 94, which leads to the formation of a control signal VST17 via AND circuit 117. This signal actuates circuit 132, 133, 135 for generating a series of 17 shift pulses SHP in the manner described above. Pulses SHP are fed to the shift clock input of register KR1 via OR circuit 179 where they perform a rotational shift to the left by 17 bit positions. Then, monostable flip-flop circuit 154 is actuated via OR circuit 152 to generate a clock signal t3. Clock signal t3 initially generates a control signal AST via AND circuit 106 conditioned by the signal on line 94. Said signal AST triggers an addition cycle of adder 84 (FIG. 3), during which the contents of register KR2 are added to the contents of register KR1.

In addition, clock signal t3 is fed to register 30 via OR circuit 35 and line 33. Via OR circuit 35 and line 33, clock signal t3 causes the contents of data register 30 to be left shifted by one bit position, whereby the bit just processed is lost in register 30 and the bit which was previously in the second position from the left is fed to the left-most bit position. Clock signal t3 also causes via line 61 the contents of buffer register 60 to be shifted by one position to the right, clearing the left-most bit position of said register for the receipt of the result of the next substitution operation.

This completes the processing of the first data bit. In accordance with this procedure, bit counter 156 was decremented by one counting position at clock time t3. The operations triggered by clock signals t1 to t3, as described above, are repeated for each bit contained in data register 30. The time from the processing of the first bit to the processing of the last bit is designated at T2 in FIG. 6. This time varies, since it is a function of the length of the data field in register 30 and of the rotational shifts to be performed in register KR1, which in turn are determined by the zero value or the one value of the data bits appearing on line 78 and the corresponding values of the key bits appearing on line 77. For the second bit cycle of phase T2, FIG. 6 shows, by way of example, a rotational 5-position shift corresponding to modification case C3.

After bit counter 156 has reached its zero count, it supplies an output signal on line 155, by means of which a clock signal T3 is generated via AND circuit 162 and monostable flip-flop circuit 163. Clock signal T3 is fed, via an OR circuit 81 (FIG. 2), to the control input of AND circuit 64 transferring the contents of buffer register 60 to data register 30.

The contents of register 30 subsequently represent the state which the data field to be enciphered will assume after completion of step 17 of FIG. 1. The permutation of step 17 was achieved as a result of the bit offset when the contents of registers 30 and 60 were shifted in opposite directions.

Thus, the new contents of data register 1 are a modified version of the input data which was subsequently subjected to a renewed substitution operation in accordance with step 19 of FIG. 1. This substitution operation is controlled by the half of the enciphering key stored in register 38. For this purpose, the contents of register 38 are transferred in the described manner, under control of clock signal T3, to key register 48, thus replacing the key bits stored at that time in registers KR1 and KR2.

The renewed sequential exclusive-OR combination of the contents of data register 30 with the contents of the key register is again effected under control of clock pulses t1 to t3 in the manner described above, for which purpose monostable flip-flop circuit 164 actuated by clock signal T3 operates circuits 149, 150 and 154 for a repetition of the cycles. These cycles are again counted by bit counter 156 conditioned via AND circuit 141 and which thus covers the time T4 of FIG. 6. Bit counter 156 again indicates on line 155 when the last bit of data register 30 has been processed. At that time, substitution step 19 of FIG. 1 is completed. Preparatory to the next substitution step 23, the contents of buffer register 60 are fed back to data register 30. This is effected with the aid of clock signal T7 which was triggered by the last output signal of counter 156 via AND circuit 168 and monostable flip-flop circuit 170. Clock signal T5 is applied via OR circuit 81 to AND circuit 64, again opening the latter for the transfer from register 60 to register 30. Clock signal T5 is also applied to control signal input of AND circuit 44 via OR circuit 51, thus transferring the contents of register 37 to key register 48. In addition, the last output signal of bit counter 156, via OR circuit 147 and AND circuit 141, again causes bit counter 156 to be loaded with the bit length value supplied by decoder 153 on its output. This completes the preparations for substitution step 23.

Substitution step 23 in the pulse time diagram of FIG. 6 is carried out in period T6. The bit substitutions to be effected in this phase by exclusive-OR circuit 56 are carried out in the same manner as previously described for the time periods T2 and T4, with the following exception. The result signals appearing on the output of exclusive-OR circuit 56 are directly fed to data register 30 via an AND circuit 82 and line 70, shown in FIG. 2. Line 70 is connected to the input of the right-most bit position of register 30, so that each result bit of the exclusive-OR circuit is initially stored in this bit position. By means of clock signal t3 following the formation of the respective result bit, the contents of data register 30 are shifted by one position to the left, so that the right-most bit position is free to receive the next result bit of circuit 56. During period T6, AND circuit 82 is opened by a clock signal on a control line with the same reference symbol, which T6 is connected to the output of flip-flop circuit 174 (FIG. 5). Flip-flop circuit 174 is switched to the one-state by means of an output signal from monostable flip-flop circuit 172 actuated by clock signal T5 and is reset to the zero-state at the end of period T6 via AND circuit 176 by means of the subsequent output signal from bit counter 156. The output signal of AND circuit 176 simultaneously indicates the end of the enciphering operation. At that time, register 30 contains, right-justified, the enciphered version of the input data bytes originally entered into.

The enciphered data are subsequently read byte-by-byte from data register 30 via an output bus 83. This is effected in a manner similar to that employed for feeding the input data bytes to register 30. The eight cores of bus 83 are connected to the outputs of the eight adjacent bit positions on the left-hand side of data register 30, and after each data byte reading step, the remaining contents of register 30 are shifted by eight bit positions to the left in the manner described above in connection with the data input.

A deciphering operation is performed similar to an enciphering operation, with the exception of the key modifications in accordance with steps 18, 22 and 24 of FIG. 1. At the start of a deciphering operation, flip-flop circuit 98 (FIG. 4) is set, via a one-input signal V/E, to the one-state in which its output line 101 carries a signal. This leads to a change in decoder 92 with regard to the generated selection control signals C3 and C4, while the effect of selection control signals C1 and C2 remains unchanged. This change leads to selection control signal C3 conditioning AND circuit 114, rather than AND circuit 115, for the passage of clock signals t2, so that in the place of a control signal VST5 a control signal VST1 is generated. While clock signal VST5 generates a series of five shift pulses SHP via circuits 122, 123 and 125, control signal VST1 merely shifts the contents of register KR1 by one bit position. With regard to the remaining steps, the effect of control signal VST1 on the operation of clock circuit 149, 150, 154 is the same as that of the output signal of counter 125 on line 128.

In the case of deciphering, selection control signal C3 remains ineffective with regard to AND circuit 102, i.e., no selection control signal AST is generated and, consequently, no addition is performed by adder 84.

When decoder 92 generates a selection control signal C4 (FIG. 4) during a deciphering operation, AND circuit 116, rather than AND circuit 113, is conditioned to pass clock signals t2. Thus, in the place of a control signal VST1, a control signal VST5 is generated which in register KR1 produces a rotational shift by five positions to the left, in comparison with the one-position shift produced by control signal VST1. During a deciphering operation, selection control signal C4 also conditions AND circuit 108 to pass clock signals t3 for the generation of an addition control signal AST. In contrast with this, AND circuit 108 remains blocked during enciphering, thus preventing an addition in accordance with table II.

During deciphering, the remaining operations of the arrangement of FIG. 2 are performed in the same manner as during enciphering.

Deviating from the illustrated arrangement, both the substitution by circuit 56 and the substitution by circuit 75 can be replaced by other substitutions of known elements. A substitution performed by means of a logical or arithmetic combination can be replaced, for example, by a loop-up of stored values. In such case, the input values of circuit 56, for example, can serve as address values of a storage containing predetermined substitution bits in the addressed positions. This mode is particularly advantageous when the data and key segments to be sequentially processed comprise more than one bit. Similarly, the arithmetic substitution circuit can be replaced by a storage to which the contents of registers KR1 and KR2 are applied as address values either in full or in part, in order to look-up predetermined substitution values and to transfer them to register KR2 and/or KR1. The use of storages for executing the substitution operations has the advantage that the substitution mode can be readily changed by simply exchanging the stored substitution values.

It is to be noted that the described arrangement can be modified further by effecting the key bit permutation by means of separate circuits rather than be positional shifts, whereby the separate circuits are arranged parallel or in series with the substitution circuit 75, generating in a known manner positional offsets with the aid of fixed or variable line offsets.

In the illustrated enciphering/deciphering arrangement, the modification mode selection signals C1 to C4 are generated in accordance with a fixed pattern. But this does not have to be necessarily so. Without departing from the scope of the subject invention, it is possible to variably associate the selection control signals C1 to C4 with the input signals on lines 77 and 78, in order to change, for example, after a particular number of enciphering operations the enciphering pattern in the interest of increased safety. For this purpose, decoder 92 can be replaced by a variably programmable logic array (PLA) known in the art. Where data and key segments are to be sequentially processed and comprise more than one bit, this leads to a highly variable and most efficient operation, since here the number of selection control signals possible can be considerably higher than 4.

The illustrated arrangement can be modified further be replacing control circuits 34, modification mode control circuit 76 and also other elements of the arrangement of FIG. 2 either in full or in part by means of suitably programmed functions of a microprocessor, without departing from the scope of the invention. The use of a microprocessor is particularly suitable for the generation of the clock signals t1 to t3 and T1 to T3, T5, and T6. Similarly, adder 84, for example, can be operated by means of the arithmetic unit of a microprocessor. The same applies to rotational shifts with the contents of register KR1.

If a very high operating speed is a decisive factor for the use of the described enciphering/deciphering method, several arrangements of the kind described can be employed in parallel. This is possible since the individual data fields of an extensive data flow are enciphered independently of each other. The capacity of the enciphering arrangement can be increased with the aid of the pipeline concept. In this case, one arrangement of the kind shown in FIG. 2, but without buffer register 60, is provided for each of the three substitution cycles in accordance with steps 16, 19 and 23 of FIG. 1, the result signals generated by exclusive-OR circuit 56 being fed in the manner described for register 60 to data register 30 of the next circuit. For this purpose, said data register is suitable for positional shifts in both directions. Thus, three enciphering arrangements of the kind illustrated in FIG. 2 are series-connected, the first being coupled with the second and the second being coupled with the third by one common data register 30. With such an arrangement, enciphering of a data field can begin as soon as the preceding data field has completed the first cycle (substitution step) and has been transferred to data register 30 of the next arrangement. In this manner, three consecutive data fields can be enciphered or deciphered overlapped in time.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Method for the enciphering and authorized deciphering of multi-digit data, comprising
   subjecting successive data segments, under control of corresponding segments of an enciphering key, to a substitution operation generating a modified version of the data segment; and
   in each substitution operation, selecting one of several given modification modes, as a predetermined function of a data segment and the corresponding key segment for changing the enciphering key before the next substitution operation upon the next corresponding segment.

2. Method as recited in claim 1, wherein said data segment and said key segment consist of one binary bit each, and both bits select one of four predetermined modification modes as a modification operation.

3. Method as recited in claim 2, wherein the permutation operation is a symmetrical rotation of the bit positions.

4. Method as recited in claim 1, wherein the deciphering operation differs from the enciphering operation in that the selection of the modification operations is reversed.

5. Method as recited in claim 1, wherein the predetermined key modifications are substitution operations and/or permutation operations of the bits of the enciphering key, and that several different kinds of said operations are provided for selection by the data segments and the key segments.

6. Method as recited in claim 1, wherein the substitution operations and permutation operations extend to all bits of the respective effective part of the enciphering key.

7. Method for the enciphering and authorized deciphering of multi-digit data, comprising
   subjecting to a substitution operation a data segment and a key segment of a first key word (first enciphering key half) to generate a modified version of the data segments,
   selecting one of several different modification operations by means of which the first key word is modified before the next substitution operation, and
   repeating the above steps with the remaining data segments of the data register and the corresponding segments of the repeatedly modified first key word, such that with the modified version of the data a permutation operation is carried out, the result of which again causes a data segment and a key segment of a second key word (second enciphering key half) to be both subjected to a substitution operation which again generates a modified version of the data segment, and to also select one of several different modification operations, by means of which the second key word is modified before the next substitution operation, said last steps being repeated with the remaining segments of the modified data and corresponding segments of the repeatedly modified second key word.

8. Method as recited in claim 7, comprising,
   further permutating the repeatedly modified data,
   subjecting segment-by-segment to a further substitution operation, the result of said further permutation together with the corresponding segments of the repeatedly modified first key word, supplying the enciphered version of the data segments, and
   between every two of said substitution operations, providing a modification operation of the first key word, which is selected jointly by the corresponding data segment and the corresponding key segment.

9. Method as recited in claim 7, wherein said data segment and said key segment consist of one binary bit each, and both bits select one of four predetermined modification modes as a modification operation.

10. Method as recited in claim 9, wherein the permutation operation is a symmetrical rotation of the bit positions.

11. Method as recited in claim 7, wherein the deciphering operation differs from the enciphering operation in that the selection of the modification operations is reversed.

12. Method as recited in claim 7, wherein the predetermined key modifications are substitution operations and/or permutation operations of the bits of the enciphering key, and that several different kinds of said operations are provided for selection by the data segments and the key segments.

13. Method as recited in claim 7, wherein the substitution operations and/or permutation operations extend to all bits of the respective effective part of the enciphering key.

14. System for the enciphering and authorized deciphering of multi-digit data, comprising:
   data register means for storing the data to be enciphered and deciphered;
   key register means for storing an enciphering key for operating on said data;
   substitution means, connected to said data register means and said key register means, for subjecting successive data segments, under control of corresponding segments of an enciphering key, to a substitution operation generating a modified version of the data segment; and
   modification means, connected to the outputs of said data register means and said key register means, for changing, as a function of the data segments and the corresponding key segments, the enciphering key before next substitution operation, said modification means including means for selecting, in each substitution operation, one of several given modification modes.

15. System as recited in claim 14, further comprising,
   a substitution stage included in said substitution means that is connected to both one segment output of said data register means and to said key register means,
   a buffer register connected to the output of said substituion stage;
   said modification means, which can be set to different modes, is connected to an output and to an input of said key register means, and modification means includes a modification mode control circuit receiving selection signals from the segment outputs of said data register means and said key register means, for modifying as a function thereof and of the data, the contents of the key register between two operational cycles of said substitution stage.

16. System as recited in claim 15, wherein said substitution stage is designed as an exclusive-OR circuit to which the bits of said data register means and key register means are serially applied.

17. Systems as recited in claim 15, wherein said data register means as well as said buffer register are designed as shift registers, said buffer register has a direction of shift opposite to that of said data register means, and a feedback line is provided from one parallel output of said buffer register to a parallel input of said data register means.

18. System as recited in claim 15, wherein said modification mode control circuit comprises a decoder to which the input bits of said substitution stage are applied, generating therefrom several modification control signals which set said modification circuit to selectively execute at least one of several different modification steps.

19. System as recited in claim 15, wherein said modification means comprises a permutation circuit and a substitution circuit which are selected and actuated by the segment outputs of said data register means and said key register means, either individually or jointly for different modifications of the enciphering key.

20. System as recited in claim 15, wherein said modification means comprises an arithmetic unit for arithmetically combining key fields, as well as a logic circuit for executing logical operations, both said arithmetic unit and said logic circuit being operated between two operational cycles of said substitution stage by means of control signals generated by said modifiction mode control circuit.

21. System as recited in claim 20, wherein said modification means comprises an adder connected with one input to the output of a first partial register (KR1) and with the other input to a second partial register (KR2) of said key register means, the result signals of said adder being fed back to the first partial register (KR1), and said modification means also comprises shift means for the execution of different rotational position shifts on at least a part of the contents of said key register means, whereby a modification operation optionally comprises one addition and/or one of several different rotational position shifts.

22. System as recited in claim 15, wherein said key register means is designed at least in part as a feedback shift register, and the series output of said feedback shift register is connected both to said substitution stage and to said modification mode control circuit.

23. System as recited in claim 15, comprising a clock control circuit providing clock signals for the execution of three data substitution cycles via the bit positions of a variable length data field to be processed, said clock control circuit additionally providing between two substitution cycles at least two clock signal phases for actuating the enciphering key modification means, and after each of the first two data substitution cycles, actuating a gate circuit for feeding the modified data from said buffer register back to said data register means.

24. System as recited in claim 23, wherein said clock control circuit includes a data field length control circuit which limits the number of segment processing cycles to the position number of the data field stored in data register.

25. System as recited in claim 23, wherein said clock control circuit includes a counter adjustable to the position number of the variable length data field to be processed, thereby determining within the data substitution cycles the number of substitution cycles, the number of shift cycles in the registers, and the enciphering key modification cycles according to the position number of the data field to be processed.

* * * * *